United States Patent [19]

Stoll

[11] Patent Number: 5,966,361
[45] Date of Patent: Oct. 12, 1999

[54] SPINNING DISC VOLUME HOLOGRAPHIC MEMORY

[75] Inventor: Harold M. Stoll, Rancho Palos Verdes, Calif.

[73] Assignee: Northrop Grumman Corporation, Los Angeles, Calif.

[21] Appl. No.: 09/226,069

[22] Filed: Jan. 6, 1998

Related U.S. Application Data

[62] Division of application No. 08/819,793, Mar. 18, 1997.

[51] Int. Cl.$^6$ ........................................................ G11B 7/00
[52] U.S. Cl. ............................................. 369/103; 369/112
[58] Field of Search ..................................... 369/103, 100, 369/109, 110, 112, 102, 44.12, 44.11, 44.14, 59, 47, 58

[56] References Cited

U.S. PATENT DOCUMENTS

| | | | |
|---|---|---|---|
| 3,610,722 | 10/1971 | Bestenreimer et al. | 352/31 |
| 3,737,878 | 6/1973 | Gamblin et al. | 340/173 |
| 3,848,096 | 11/1974 | Marko | 179/100.3 |
| 4,104,489 | 8/1978 | Satoh et al. | 179/100.3 |
| 4,175,823 | 11/1979 | Pekau et al. | 350/3.79 |
| 4,224,480 | 9/1980 | Satoh et al. | 179/100.3 |
| 4,420,829 | 12/1983 | Carlson | 369/103 |
| 4,449,785 | 5/1984 | Huignard et al. | 350/3.61 |
| 4,837,843 | 6/1989 | Owechko | 382/31 |
| 4,929,823 | 5/1990 | Kato et al. | 250/201.51 |
| 5,111,445 | 5/1992 | Psaltis et al. | 369/103 |
| 5,121,371 | 6/1992 | Farnsworth et al. | 369/44.26 |
| 5,128,693 | 7/1992 | Tatemichi et al. | 346/108 |
| 5,212,572 | 5/1993 | Krantz et al. | 359/15 |
| 5,272,550 | 12/1993 | Dickson et al. | 359/3 |
| 5,285,438 | 2/1994 | Marchand et al. | 369/103 |
| 5,339,305 | 8/1994 | Curtis et al. | 369/112 |
| 5,422,873 | 6/1995 | Kewitsch et al. | 369/103 |
| 5,627,664 | 5/1997 | Trisnadi | 369/102 |
| 5,703,705 | 12/1997 | Curtis et al. | 369/103 X |

*Primary Examiner*—Muhammad Edun
*Attorney, Agent, or Firm*—Terry J. Anderson; Karl J. Hoch, Jr.

[57] ABSTRACT

A volume holographic memory has a spinning disk comprised of photorefractive medium, object beam optics configured to direct an object beam through the outer edge of the disk, and reference beam optics configured to simultaneously direct a reference beam through the outer edge of the disk. An angle multiplexer manipulates the reference beam to facilitate the formation of angle multiplexed volume holograms. The object beam and the reference beam cooperate within the photorefractive medium to sequentially form a plurality of sets of angle multiplexed volume holograms therein while the disk is spinning. A phase conjugator directs a conjugate reference beam back through the disk after the reference beam has previously passed therethrough, so as to form a conjugate object beam to facilitate read-out. Amplitude monitoring is provided to facilitate use of an exposure schedule. Path length monitoring assures consistent phase relationship between the object and reference beams for write and erase operations. Calibration of the angle multiplexer is provided.

12 Claims, 4 Drawing Sheets

SPINNING DISC VOLUME HOLOGRAPHIC MEMORY

This is a division of application Ser. No. 08/819,793, filed Mar. 18, 1997.

FIELD OF THE INVENTION

The present invention relates generally to holographic storage devices and more particularly to a method and device for storing a plurality of volume holograms within a spinning, disk-shaped, photorefractive medium.

BACKGROUND OF THE INVENTION

Holographic techniques for storing images are well known. Such techniques are commonly used to store images in a wide variety of different applications. Additionally, various methodologies for utilizing such holographic techniques to store digital data for use in computer systems are currently being explored.

The technique for forming holograms comprises splitting the highly coherent output beam of a laser into separate reference and object beams. The reference beam is directed onto the holographic storage medium, e.g., a photorefractive material, while the object beam is directed onto the object whose image is to be stored. Light from the object is directed to the photorefractive medium wherein an interference pattern is formed due to the interaction of the reference beam with the object beam.

When utilized in digital data storage applications, the object beam typically passes through a spatial light modulator, e.g., a liquid crystal shutter matrix, rather than being reflected off an object, in order to form the holographic image. The spatial light modulator adds the desired digital data to the object beam to facilitate storage of the digital data in the hologram formed therefrom.

Regardless of the application (i.e., the storage of images or data), subsequently,dtirecting a reference beam onto the holographic storage medium results in the reconstruction of an image representative of the originally illuminated object or stored digital data.

Also known are techniques for storing a plurality of such images within a single photorefractive medium via angle-multiplexing of the reference beam. Such angle-multiplexing is discussed in "THEORY OF OPTICAL INFORMATION STORAGE IN SOLIDS", Applied Optics, Vol. 2, No. 4, pg. 393 (1963). The method of angle-multiplexing generally involves maintaining a constant angle for the object beam, while varying the angle of the reference beam for each sequential exposure, i.e., the formation of each separate hologram. Angle-multiplexing thus allows a large number of holograms to be stored within a common volume of photorefractive medium, thereby greatly enhancing the storage density thereof.

Also known are techniques for storing a plurality of such holograms within a spinning drum or disk shaped photorefractive medium. Examples of some holographic memories which utilize drum or disk shaped medium are provided in U.S. Pat. Nos. 3,610,722; 3,737,878; 3,848,096; 4,104,489; 4,224,480; 4,420,829; 4,449,785; 4,929,823; 5,111,445; 5,128,693; 5,285,438; 5,339,305.

However, one problem commonly associated with such contemporary disk and drum based holographic memories is that the geometry of the system is not optimized with respect to the crystalline structure of the storage medium. Further, such contemporary systems do not utilize effective path-length monitoring so as to assure the integrity of holograms within the medium and to assure reliable read-out of a plurality of different sets of angle-multiplexed holograms.

As such, although the prior art has recognized to a limited extend the problem of storing volume holograms in a spinning disk medium, the proposed solutions, to date, have been ineffective in providing a satisfactory remedy.

SUMMARY OF THE INVENTION

The present invention specifically addresses and alleviates the above-mentioned deficiencies associated with the prior art. More particularly, the present invention comprises a volume holographic memory comprising a disk comprised of photorefractive medium and configured to spin about a central axis thereof. The spin axis is perpendicular to a central opening formed within the disk such that the disk spins in a manner similar to that of a contemporary CD-ROM.

Object beam optics are configured to direct an object beam through the outer edge of the disk and reference beam optics are similarly configured to direct a reference beam through the outer edge of the disk. The object beam and the reference beam intersect within the photorefractive medium wherein they cooperate so as to sequentially form a plurality of separate volume holograms within the spinning disk. Such volume holograms may be written to, erased from, or read from the disk while the disk is spinning, so as to provide a fast, high density memory.

An angle multiplexer varies the angle at which either the object beam or the reference beam, preferably the reference beam, is directed through the outer edge of the disk. The angle multiplexer preferably comprises a galvanometer mirror. The storage density of the photorefractive medium is substantially enhanced via the use of such angle multiplexing.

Both the object beam and the reference beam are preferably directed into the center opening of the disk after cooperating to form a hologram, and are then reflected from the center opening of the disk via a reflecting element, preferably a pair of beam splitters. During write and erase operations, both the object and reference beams may be terminated, preferably via beam blocks, after exiting the disk, since their task has been completed and they are both no longer needed. During read-out operations, one of the two beam splitters disposed within the central opening of the disk directs the reference beam from the central opening of the disk to a phase conjugator.

The phase conjugator forms a conjugate reference beam which is directed back through the beam splitter and into the photorefractive medium of the spinning disk. As the conjugate reference beam is transmitted through the photorefractive medium, a previously stored hologram formed therein causes the conjugate reference beam to be transformed into a conjugate object beam which is representative of the hologram effecting such transformation. Thus, the conjugate reference beam excites a conjugate object beam from the stored hologram. The excited conjugate object beam is then read by a sensor, preferably a two-dimensional array charge coupled device (CCD), so as to provide an electrical signal representative of the originally stored data.

As those skilled in the art will appreciate, the phase conjugator removes distortions introduced into stored holograms in a manner which facilitates the use of inexpensive, fast, (i.e., low f/#) object beam optics. Thus, the effects of distortion, such as spreading of the object beam due to undesirable diffraction, are substantially reversed by the phase conjugator.

According to the preferred embodiment of the present invention, a high-power pulsed laser is utilized for the write, erase, and read-out operations. The energy density obtained by such a high-power pulsed laser, when focused, is sufficient to cause ionization of the air in the immediately vicinity of the focus. For this reason, a pressure cell is preferably disposed at the focus of the reference beam optics, where the power density is greatest, so as to inhibit such ionization. Those skilled in the art will appreciate that air ionization is inhibited at increased pressure.

The present invention preferably comprises a liquid Stimulated Brillouin Scattering (SBS) phase conjugator, preferably comprised of methanol. Those skilled in the art will appreciate that various other phase conjugating materials are likewise suitable.

According to the preferred embodiment of the present invention, a Pockels cell is utilized to rotate the polarization of the laser beam from which the object and reference beams are formed to an orientation suitable for writing, erasing, and reading of holograms, according to well-known principles.

A spatial light modulator (SLM) is utilized for modulating, i.e., applying digital data to, the object beam. According to the preferred embodiment of the present invention, a 1024×1024 pixel reflecting type spatial light modulator is utilized to facilitate the storage of 1.18 terabits of data, as discussed in detail below. Those skilled in the art will appreciate that various different resolutions of spatial light modulators are likewise suitable.

A reflecting element, preferably the spatial light modulator, is disposed upon a translation stage and configured to vary the path length of one of the object and reference beams, preferably object beam, so as to facilitate adjustment of the relative path lengths of the object and reference beams. The translation stage preferably comprises a piezoelectro translation stage to facilitate automatic measurement and precise control of relative path lengths of the object and reference beams. Those skilled in the art will appreciate that various other types of translation stages are likewise suitable.

A sensor, preferably a one-dimensional array charged coupled device (CCD), measures the intensity or diffraction efficiency of holograms formed within the disk. This facilitates the formation of holograms according to an exposure schedule wherein later formed holograms are stored at a lower intensity than earlier formed holograms. The use of an exposure schedule and the formation of multiple holograms within a single media is taught in "STORAGE OF 500 HIGH RESOLUTION HOLOGRAMS IN A LiNbO$_3$ CRYSTAL", Optics Letters, Vol. 62, No. 8, p. 105 (1991).

The use of such an exposure schedule has been found to be helpful in minimizing diffraction efficiency degradation. More particularly, according to such exposure schedules, earlier stored holograms are formed utilizing more intense object and reference beams than later stored holograms, such that each subsequent write process tends to lower the diffraction deficiency of the earlier stored holograms in a manner which substantially equalizes the diffraction deficiency of all stored holograms. Thus, according to such exposure schedules, each succeeding hologram is stored using a lower intensity than the preceding holograms.

According to the preferred embodiment of the present invention, the object beam optics and the reference beam optics are configured so as to define an interferometer. The one-dimensional CCD array detects interference fringes resulting from combining of the object and reference beams, so as to permit measurement of the relative path lengths of the object beam path and the reference beam path. Thus, the relative path lengths of the object and reference beams can be adjusted via the piezoelectric translation stage such that the object and reference beams are in a constant or desired phase relation during write operations and are 180 degrees from this constant or desired phase relationship during erase operations.

In order to maintain and/or duplicate the desired phase relationship of the object and reference beams during write processes, a plurality of plane-wave holograms are preferably formed within the spinning disk when the phase relationship of the object and reference beams is at a desired angle. The desired phase relationship can subsequently be reproduced by utilizing the plane-wave holograms as diffraction gradings, so as to define a Michaelson interferometer which is utilized to monitor the relative path lengths of the object and reference beams, as discussed in detail below. Preferably, such plane-wave holograms are formed at each radial location of the spinning disk and at the top, middle, and bottom angles for each location. However, those skilled in the art will appreciate that various different schemes for positioning and configuring such plane-wave holograms are likewise suitable.

A sensor, preferably the same one-dimensional array as used for measurement of the relative path lengths of the object beam path and reference beam path, senses the position of the reference beam after it has been transmitted through the disk, so as to provide an indication of the position of the galvanometer mirror, thereby facilitating calibration of the galvanometer mirror.

The disk is preferably comprised of LiNbO$_3$, preferably iron-doped (LiNbO$_3$:Fe), and is preferably approximately six centimeters in diameter and approximately two centimeters thick and preferably has a central opening of approximately two centimeters in diameter.

According to the preferred embodiment of the present invention, the disk is configured such that the reference beam and the object beam contact the upper and lower surfaces thereof during writing and erase processes, so as to facilitate the dissipation of electrical charges within the photorefractive medium generated by the photovoltaic effect. To accomplish this, grooves are preferably formed in the upper and lower surfaces of the disk so as to define an hourglass-like cross section thereof. Fillets are preferably formed within the groove so as to mitigate the formation of stress cracks.

Further, a conductive coating is preferably applied to the upper and lower surfaces of the disk and the two conductive coatings are preferably grounded and/or shorted to one another so as to facilitate the dissipation of electrical charge accumulating thereon.

Thus, according to the present invention, a device and methodology are provided for storing a plurality of volume holograms within a spinning, disk-shaped photorefractive medium in a manner which optimizes hologram storage with respect to the crystalline structure orientation of the photorefractive material. Amplitude monitoring of the stored holograms facilitates the use of an exposure schedule to minimize diffraction efficiency degradation; path length monitoring is accomplished via the use of an interferometer defined by the object beam and reference beam optics; and calibration of the scanner or galvanometer mirror utilized to direct the reference beam to the spinning disk is provided.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions of the present invention as well as the sequence of steps for constructing and operating the invention, in connection with the illustrated embodiment. It is to be understood, that the same or equivalent functions and sequences may be accomplished by different embodiments that are also intended to be encompassed within the spirit and scope of the invention.

The spinning disk volume holographic memory of the present invention is illustrated in FIGS. 1–10 which depict a presently preferred embodiment of the invention.

Spinning Disk Photorefractive Media

Figure 1A:
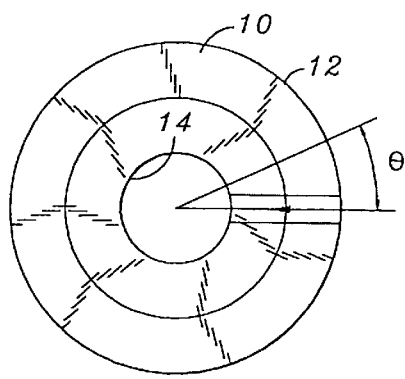
FIG. 1a is a top view of the disk which is comprised of a photorefractive medium within which volume holograms are formed.
Figure 1B:
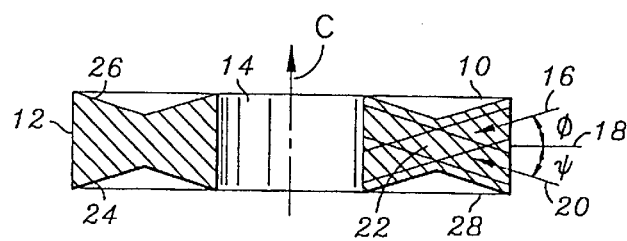
FIG. 1b is a side view of the disk of FIG. 1, additionally showing how an object beam interacts with a reference beam to form a volume hologram therein.

Referring now to FIGS. 1a and 1b, the present invention generally comprises a disk 10 comprised of a photorefractive medium, preferably $LiNbO_3$:Fe. The use of $LiNbO_3$:Fe as a medium for the storage of volume holograms is described in "MULTIPLE STORAGE AND ERASURE OF FIXED HOLOGRAMS IN FE-DOPED $LiNbO_3$.", Applied Physics Letters, Vol. 26, No. 4, p. 182 (1975). The disk 10 comprises a peripheral outer edge 12 and a central opening 14.

With particular reference to FIG. 1b, according to the preferred embodiment of the present invention the object beam 16 enters the edge 12 of the disk at angle $\phi$ with respect to the plane 18 of the disk 10. Similarly, the reference beam 20 enters the disk through the edge 12 thereof at an angle $\psi$ with respect to the plane 18 of the disk 10. The object beam 16 and the reference beam 20 interfere with one another so as to produce a volume hologram 22 within the disk 10, according to well known principles. The object beam 16 and the reference beam 20 exit the disk through the central opening 14 thereof. A plurality of separate angularly multiplexed holograms are formed at each location within the disk 10 by varying the angle $\psi$ of the reference beam. Those skilled in the art will appreciate that, alternatively, either the angle $\phi$ of the object beam, or the angles $\phi$ or $\psi$, of both the object beam and reference beam, respectively, may be varied so as to achieve such angle multiplexing.

The C axis of the disk 10 is in the up direction, as shown in FIG. 1b. Thus, holograms are most efficiently formed in the disk 10 by directing the object beam 16 and the reference beam 20 thereinto through the outer edge 12 thereof. Such configuration of the photorefractive media takes best advantage of the crystalline structure and its orientation within the photorefractive media, and thus tends to optimize storage density and diffraction efficiency.

With particular reference to FIG. 1a, a plurality of different sets of volume holograms are formed at each location within the disk 10 by varying the angle e of both the object and reference beams, i.e., by rotating the spinning disk 10 relative thereto.

The object beam and the reference beam preferably each have a diameter of approximately 5 mm at the location within the disk where they interact to form a volume hologram. Angle $\phi$ at which the object beam enters the disk 10 is preferably approximately 12.5 degrees and angle $\psi$ at which the reference beam enters the disk 10 is preferably approximately 12.5 degrees. The reference beam preferably scans by ±3.0 degrees with respect to the nominal angle of 12.5 degrees.

The multiplexing resolution for the disk 10, according to the preferred embodiment of the present invention, is based upon rotational increments $\Delta\theta$ of approximately 1.92 degrees and reference beam increments $\Delta\psi$ of approximately 0.004 degrees. Thus, the multiplexing density is based upon $N_\theta$=360 degrees/$\Delta\theta$=188 different angles of rotation of the disk 10 at which holograms may be formed and the number of different reference beam angles at which a hologram may be formed utilizing angle multiplexing at each different rotational position of the disk 10 is equal to $N_\psi$=6.0 degrees/$\Delta\psi$=1,500 different angles.

The storage capacity of the disk is thus $N_\theta \times (N_4) \times$(pixels/hologram)×(bits/pixel) which equals 188×1,500×(1,024×1,024)×4=1.18 terabits.

Figure 8:
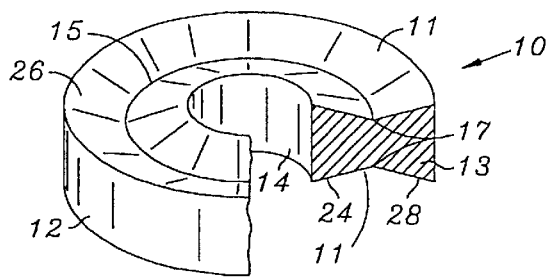
FIG. 8 is a fragmentary perspective view of the disk having a portion thereof removed so as to show the hourglass-shaped cross section thereof.

Referring now to FIG. 8, a conductive coating 24 is preferably formed upon the upper 26 and lower 28 outer surfaces of the disk 10, so as to facilitate the dissipation of any electric charge which forms thereon due to the photovoltaic effect caused by the action of the object and reference laser beams upon the photorefractive material. The conductive coating 24 formed upon the lower surface 28 is preferably shorted to the conductive coating 24 formed upon the upper surface 26 to facilitate such discharging of the charge.

Referring now to FIG. 8, the spinning disk 10 preferably comprises a groove 15 formed in both the upper 26 and lower 28 surfaces thereof, such that an hourglass-shaped cross section 13 is defined thereby. The apex of the groove 15 preferably defines a fillet 17 so as to mitigate the formation of stress cracks within the crystalline structure of the disk 10.

The hourglass-like cross section of the disk 10 generally conforms to the shape of the object beam 16 and the reference beam 20 paths within the disk 10. Thus, both the object beam 16 and the reference beam 20 contact the upper 26 and lower 28 edges of the disk 10 during read and erase operations such that photovoltaic charges generated within the body of the disk 10 are caused to flow to the outer surfaces, i.e., the upper surfaces 26 and the lower surface 28, according to well known principles. Thus, the cross-sectional configuration of the photorefractive medium is generally defined by the paths taken by the object 105 and reference beams 103 beams therewithin. Thus, such configuration of the disk facilitates the rapid dissipation of any photovoltaic charges forming within the photorefractive medium due to the photovoltaic effect.

Figure 10:
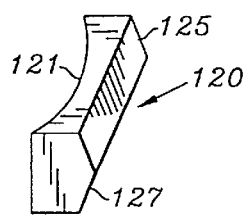
FIG. 10 is a perspective view of the coupling prism.
Figure 9:
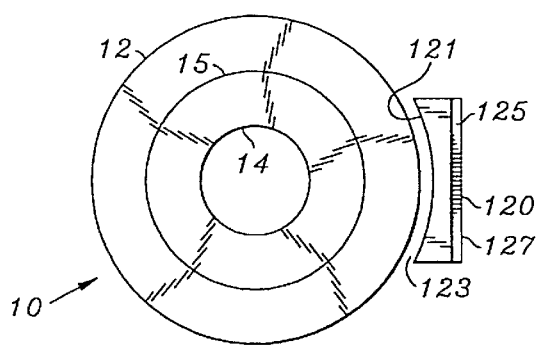
FIG. 9 is a top view of the disk and the coupling prism.

Referring now to FIGS. 9 and 10, the coupling prism 120 comprises a curved surface 121 which is complementary to the edge 12 of the disk 10 such that a gap 123 having a substantially constant distance between the disk 10 and the coupling prism 120 is defined thereby. The coupling prism 120 comprises a first planar surface 125 for receiving the object beam 105 and a second planar surface 127 for receiving the reference beam 103.

System Overview

Figure 2:
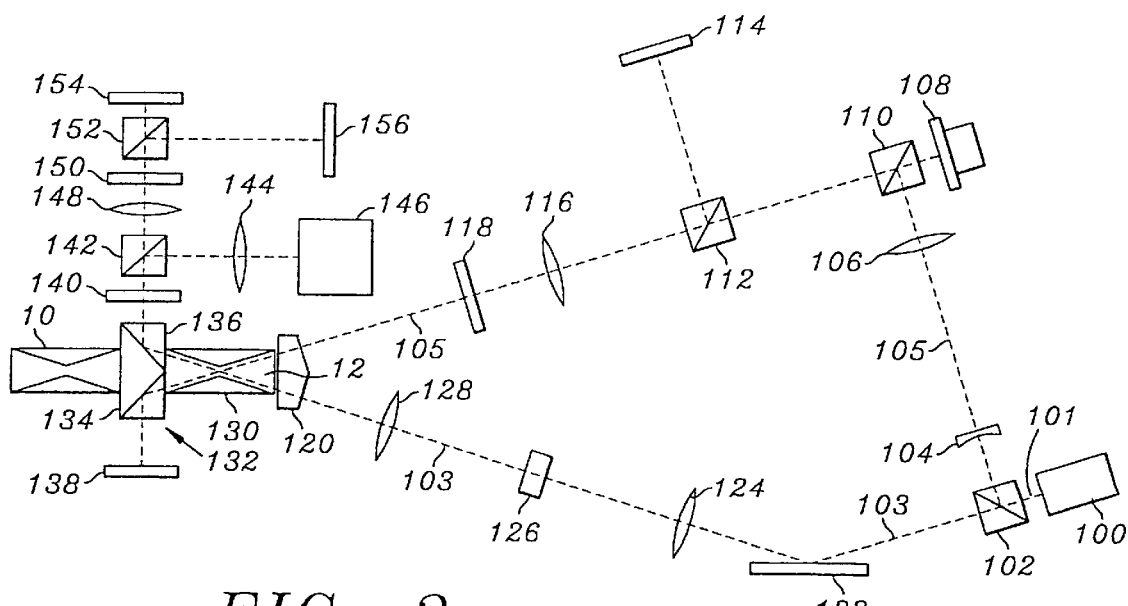
FIG. 2 is a schematic representation illustrating the geometry of the spinning disk volume holographic memory of the present invention.

Referring now to FIG. 2, the geometry and optical components of the spinning disk volume holographic memory of the present invention are illustrated and discussed generally. The spinning disk volume holographic memory system generally comprises a Pockels cell polarization rotator 100 which accepts the output of a high-power pulsed laser (not shown). The Pockels cell outputs a laser beam 101 polarized such that beam splitter 102 splits the laser beam 101 into separate object 105 and reference 103 beams during write and erase operations, as described in detail below.

Beam expansion optics, preferably comprised of planar concave lens 104 and double convex lens 106, expand the object beam 105 through beam splitter 110 onto reflection-type spatial light modulator 108. The spatial light modulator 108 is preferably mounted to a piezoelectric translation stage (not shown) such that it may be precisely moved back and forth along the optical axis thereof. The object beam 105 is modulated and reflected by the reflection-type spatial light modulator 108 back through beam splitter 110 and then through beam splitter 112, double convex lens 116, ferroelectric liquid crystal (FLC) polarization rotator 118, and through coupling prism 120. After passing through coupling prism 120, the object beam 105 is transmitted through the outer edge 12 of the disk 10 where it interferes with the reference beam 103, as discussed in detail above.

After being separated from the object beam 105, the reference beam 103 is incident upon galvanometer mirror 122 which varies the angle of incidence of the reference beam 103 with respect to the spinning disk 10. The reference beam 103 is reflected from the galvanometer mirror 122 through reference beam optics comprised of first double convex lens 124, pressure cell 126, and second double convex lens 128. The reference beam is then transmitted through coupling prism 120 along with the object beam 105 such that the object beam 105 and the reference beam 103 interfere within the spinning disk 10.

After being transmitted through the spinning disk 10, the object beam 105 and the reference beam 103 exit the spinning disk 10 into the central opening 14 formed therein and are reflected by dual beam reflector assembly 132. The reference beam 105 is reflected upwardly by beam reflector 136 to either beam block 154, one-dimensional CCD array 156, or phase conjugator 146, depending upon the operation being performed. The phase conjugator is preferably a Stimulated Brillouin Scattering phase conjugator comprising methanol. The object beam 105 is similarly reflected downwardly by beam splitter 134 to beam block 138. The upwardly reflected reference beam 103 passes through FLC polarization rotator 140, beam splitter 142, double convex lens 148, FLC polarization rotator 150, and/or the beam splitter 152, as discussed in detail below. Those portions of the object beam 105 and the reference beam 103 which are transmitted through the spinning disk 10 and reflected away therefrom via dual beam splitter assembly 132 are not used further in the write or erase operations and are thus stopped or blocked by beam blocks 138 and 154, respectively, during these operations.

The two-dimensional CCD array sensor 114 receives a conjugate beam from the disk 10 via beam splitter 112 during read-out operations, as discussed in detail below. The phase conjugator 146 receives the reference beam 103 from the dual beam splitter assembly 132 via FLC polarization rotator 140, beam splitter 142 and double convex lens 144 and provides a conjugate reference beam via the same optical path back to the disk 10 during the read-out process.

One-dimensional CCD array: 156 receives either the object beam 105, the reference beam 103, or both the object beam 105 and the reference beam 103 during amplitude monitoring, galvanometer calibration, or path length monitoring, respectively, via dual beam splitter assembly 132, FLC polarization rotator 140, beam splitter 142, double convex lens 148, FLC polarization rotator 150, and beam splitter 152, as discussed in detail below.

Write and Erase Operations

Figure 3:
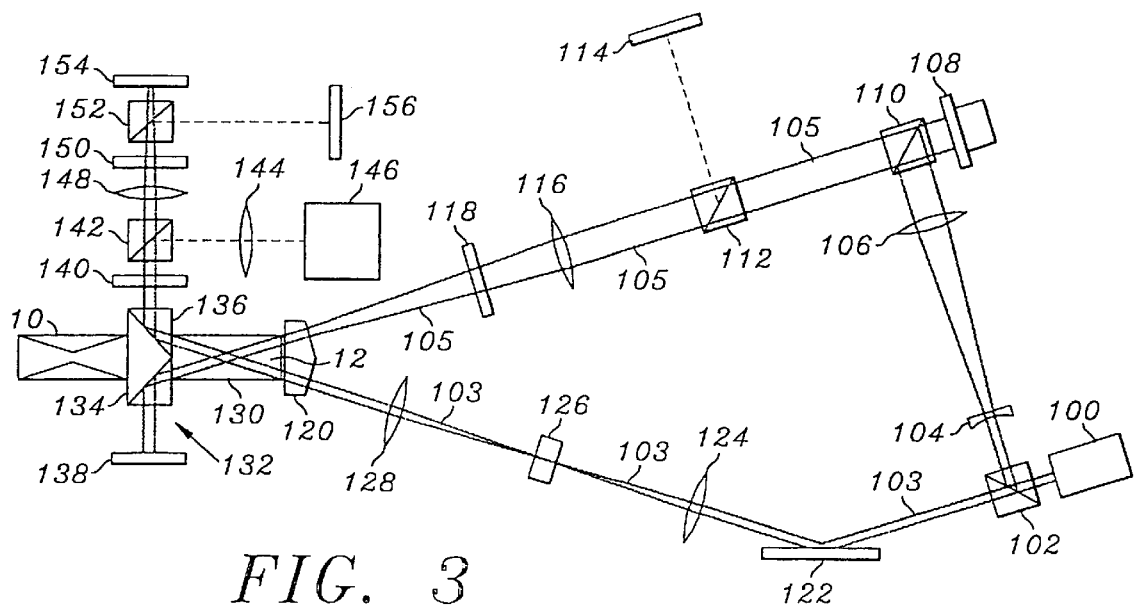
FIG. 3 is the schematic representation of the spinning disk volume holographic memory of FIG. 2 showing the light paths of the write and erase operations.

Referring now to FIG. 3, the write and erase operations are discussed in detail. During both the write and erase operations, the coherent laser output of a high-power pulsed laser (not shown) is received through Pockels cell polarization rotator 100 which rotates the polarization thereof to an orientation such that most of the energy of the laser beam is reflected by beam splitter 102 to form the object beam 105 and the remainder of the energy is transmitted through beam splitter 102 to form the reference beam 103. Preferably, approximately 70 percent ±10 percent of the laser beam forms the object beam 105 and approximately 30 percent ±10 percent of the laser beam 101 forms the reference beam 103. Such asymmetrical splitting of the laser beam 101 compensates for increased losses of the object beam 105 along the optical path thereof, as discussed above.

During write and erase processes, the object beam 105 is expanded via optics comprised of concave planar lens 104 and double convex lens 106 and directed onto spatial light modulator 108 via reflection from beam splitter 110.

During a write operation, the spatial light modulator 108 modulates the object beam, preferably with a resolution of 1024×512 pixels, and reflects the object beam back through beam splitter 110. The piezoelectric translation stage is positioned such that the object 105 and reference 103 beams are in a desired phase relationship at the spinning disk 10 where a hologram is to be formed. The actual phase relationship is not important, but should be maintained for all write operations. The object beam then passes through beam splitter 112 and double convex lens 116. FLC polarization rotator 118 then rotates the polarization of the object beam 105 to an orientation which is suitable for the formation of a volume hologram within the disk 10. Coupling prism 120 then directs the object beam 105 into the spinning disk 10 through the edge 12 thereof.

Simultaneously, the reference beam 103, formed by beam splitter 102 is reflected by galvanometer mirror 122 through focusing optics comprising double convex lens 124 and double convex lens 128. The galvanometer mirror 122 defines the angle at which the reference beam is incident upon the disk 10 to facilitate angle multiplexing of a plurality of volume holograms within the disk 10 at each angular orientation of the disk 10.

Double convex lens 124 focuses the high-power reference beam at a point intermediate between double convex lens 124 and double convex lens 128. Due to the high energy density of the reference beam at this focus, a pressure cell 126 is disposed at the focus to prevent air ionization.

Coupling prism 120 focuses and directs the reference beam 103 into the spinning disk 10 along with the object beam 105 such that the reference beam 103 and the object beam 105 interfere with one another within the photorefractive medium of the spinning disk 10 so as to form a volume holographic image therein.

The object beam 105 exits the spinning disk 10 through the central opening 14 thereof and is reflected by beam splitter assembly 134 of dual beam splitter assembly 132 downward to beam block 138 which terminates the object beam 105. Similarly, the reference beam 103 exits the spinning disk 10 at the central opening 14 thereof and is reflected upward by the beam splitter 136 of dual beam splitter assembly 132 through FLC polarization rotator 140, beam splitter 142, FLC polarization rotator 150, beam splitter 152, to be incident upon beam block 154, which terminates the reference beam 103.

The erase operation is similar to the write operation with the exception that the piezoelectric translation stage upon which the spatial light modulator 108 is mounted is translated by one-half wavelength of the laser light utilized to form the hologram being erased, such that a new hologram, identical to the original hologram but 180 degrees out of phase with the original hologram, is essentially written over the original hologram so as to effect erasure thereof. Thus, to erase a given hologram, the spatial light modulator is configured as it was during writing of the original hologram, and the write process is repeated with the translation stage shifted by one-half wavelength.

The galvanometer mirror 122 is positioned so as to angularly multiplex a plurality of different holograms at a given radial location of the spinning disk 10. Further, a plurality of such sets of angularly multiplexed holograms may be formed at a plurality of different radial positions upon the spinning disk 10.

Thus, according to the present invention, volume holograms are quickly and efficiently written to the spinning disk 10 at a plurality of different angular orientations at each location upon the spinning disk 10 and at a plurality of different radial locations of the spinning disk 10.

Read Operations

Figure 4:
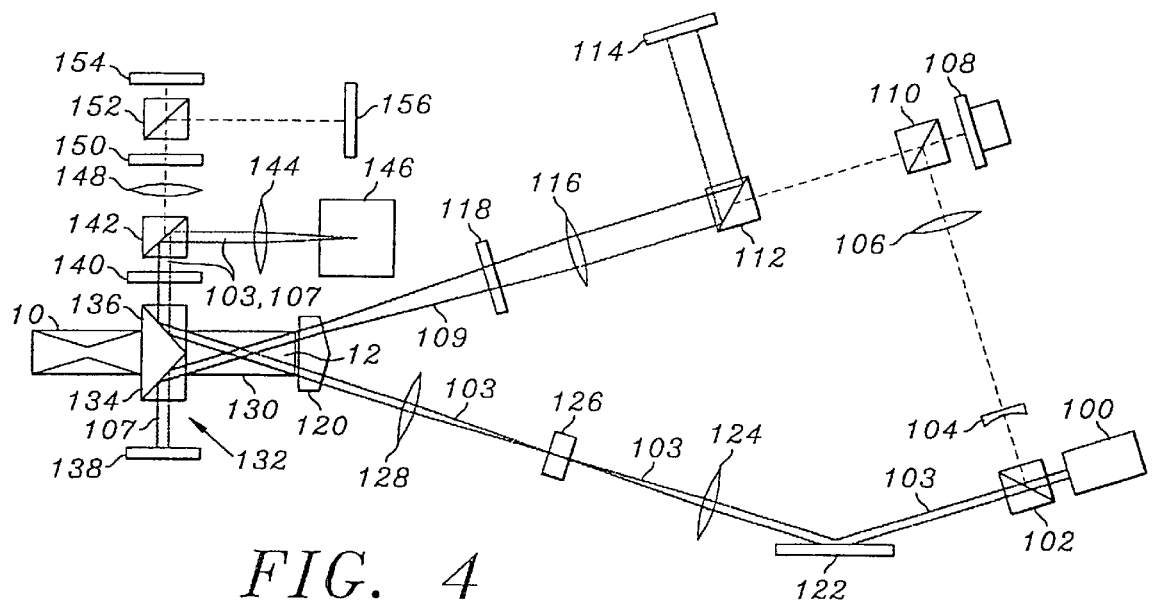
FIG. 4 is the schematic representation of the spinning disk volume holographic memory of FIG. 2 showing the light paths of the read operation.

Referring now to FIG. 4, a read-out operation of the spinning disk volume holographic memory of the present invention is described. During a read-out operation, only a reference beam is utilized. The object beam is not required. Therefore, the Pockels cell rotates the polarization of the laser beam such that substantially 100% thereof is transmitted through the beam splitter 102 and substantially none of the laser beam is reflected thereby. The power output of the laser is preferably adjusted such that it has an intensity approximately equal to that of the reference beam used to write the hologram.

Thus, during a read operation, the galvanometer mirror 122 directs the reference beam 103 at the same angle which was utilized to form the volume hologram which is to be read. The reference beam then is transmitted through double convex lens 124, pressure cell 126, double convex lens 128, and coupling prism 120, as occurred during the corresponding write operation.

After the reference beam 103 passes through the spinning disk 10, it is reflected by the first beam splitter 136 of dual beam splitter assembly 132 upward through FLC polarization rotator 140 which rotates the polarization thereof such that substantially 100% of the reference beam 103 is reflected by beam splitter 142 through double convex lens 144 to be incident upon phase conjugator 146. Phase conjugator 146 absorbs the reference beam 103 and radiates a conjugate reference beam 107 which is transmitted back through double convex lens 144 and reflected by beam splitter 142 back through FLC polarization rotator 140. The conjugate reference beam is then reflected by the first beam splitter 136 of dual beam splitter assembly 132 through the spinning disk 10 along the same path that the reference beam 103 travelled. Within the spinning disk 10, the conjugate reference beam 107 excites conjugate object beam 109, which is radiated through coupling prism 120. FLC polarization rotator 118 then rotates the polarization of the conjugate object beam 109 such that substantially 100% thereof is reflected by beam splitter 112 toward two-dimensional CCD array 114, which converts the read-out hologram or conjugate object beam 109 into an electrical signal representative thereof. In addition to reading, writing, and erasing, as described above, the ancillary functions of hologram amplitude monitoring, path length monitoring, and galvanometer calibration assure proper operation of the spinning disk volume holographic memory of the present invention. Hologram amplitude monitoring, path length monitoring, and galvanometer calibration are described in detail below.

Amplitude Monitoring

Figure 5:
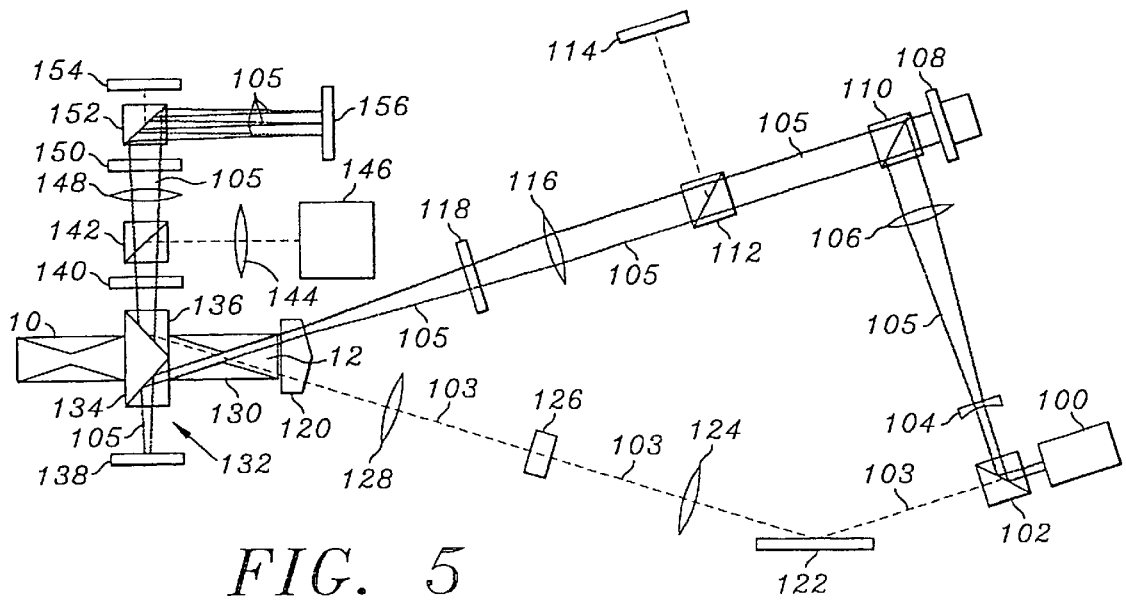
FIG. 5 is the schematic representation of the spinning disk volume holographic memory of FIG. 2 showing the light path utilized in hologram amplitude monitoring.

Referring now to FIG. 5, hologram amplitude monitoring is described. Hologram amplitude monitoring is required so as to assure that all holograms are ultimately stored at substantially equal intensities via the use of an exposure schedule, as discussed in detail above. As those skilled in the art will appreciate, it is necessary to know the intensity at which previously stored holograms are stored in order to optimize storage according to such an exposure schedule.

Amplitude monitoring is performed by rotating the phase of the laser via the Pockels cell polarization rotator 100 such that substantially 100% of the laser is reflected by beam splitter 102. The intensity of the laser is preferably adjusted to be approximately equal to that of the object beam utilized to form the volume hologram. The laser beam 105 then travels through optics comprised of concave planar lens 104 and double convex lens 106 and is then reflected onto to spatial light modulator 108 by beam splitter 110.

The spatial light modulator 108 is preferably configured to reflect substantially all of the incident laser beam 105 such that the laser beam 105 is then transmitted through beam splitter 110, beam splitter 112, and double convex lens 116. FLC polarization rotator 118 rotates the polarization of the laser beam such that it has substantially the same orientation as the object beam utilized to form the hologram whose amplitude is being measured. The laser beam then is transmitted through coupling prism 120 and into the spinning disk 10 where it is diffracted by the stored volume holograph whose amplitude is being measured. That portion of the laser beam which is not diffracted by the stored volume hologram exits the spinning disk 10 through the central opening 14 formed therein and is reflected by the second beam splitter 134 of dual beam splitter assembly 132 downward. The downwardly reflected portion of the diffracted laser beam is then terminated by beam block 138.

The diffracted portion of the laser beam is reflected upwardly by the first beam splitter 136 of dual beam splitter assembly 132 and is transmitted through FLC polarization rotator 140 which orients the polarization thereof such that substantially 100% of the diffracted laser beam is transmitted through beam splitter 142 and focused by double convex lens 148. FLC polarization rotator 150 then rotates polarization of the diffracted laser beam such that substantially 100% thereof is reflected by beam splitter 152 onto one-dimensional CCD array 156 which measures the intensity thereof and generates an electronic signal representative of the intensity of the diffracted laser beam.

The intensity of the diffracted laser beam is proportional to the amplitude or intensity with which volume hologram being monitored is stored within the photorefractive medium of the spinning disk 10. As those skilled in the art will appreciate, holograms stored with greater intensities have greater diffraction efficiencies, and thus diffract more of the laser beam toward the one-dimensional CCD array 156. This process is repeated for a plurality of the stored volume holographs stored at a particular location on the disk 10 such that volume holographs angle multiplexed at that location may be stored according to an exposure schedule, as discussed in detail above. Thus, the use of such an exposure schedule relates only to those angle multiplexed holograms formed at a particular radial location within the spinning disk 10. Such an exposure schedule need not be utilized among holograms formed at different radial locations.

Path Length Monitoring

Figure 6:
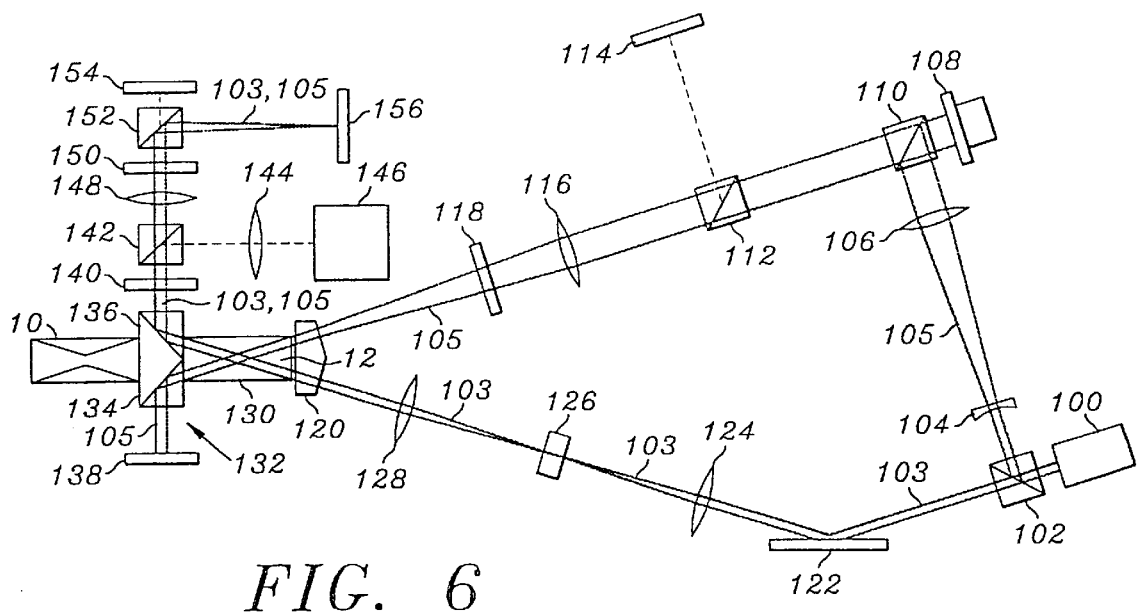
FIG. 6 is the schematic representation of the spinning disk volume holographic memory of FIG. 2 showing the light path length monitoring.

Referring now to FIG. 6, the relative length of the object beam path and the reference beam path, with respect to one another, is monitored so as to maintain a constant phase relationship between the object beam and the reference beam at the location within the photorefractive medium where they interfere with one another so as to form volume holograms. Path length monitoring thus facilitates the storage of a plurality of different volume holograms with known, common relative path lengths for the object and reference beams, so as to facilitate the erasure of previously stored volume holograms by varying the relative path lengths so as to form a complimentary or inverse hologram which effectively cancels or erases the previously stored hologram. Thus, path length monitoring is crucial to the erasure process. Such path length monitoring is accomplished by storing a sequence of plane-wave holograms within the spinning disk 10. The holographic storage system is then utilized in a manner analogous to that of a Michaelson interferometer wherein the plane-wave holograms function as diffraction type beam splitters. A comparatively strong object beam is diffracted by one of the previously stored plane-wave holograms and thus caused to interfere with a comparatively weak reference beam so as to form an interference fringe at one element of the one-dimensional CCD array 156.

More particularly, the polarization of the laser beam is oriented by the Pockels cell 100 such that a comparatively strong object beam 105 and a comparatively weak reference beam 103 are formed thereby. As in the write and erase processes, the object beam preferably comprises approximately 70% ±10% of the laser beam's original energy and the reference beam preferably comprises approximately 30% ±10% of the original laser beam's energy. The comparatively strong object beam 105 is diffracted by the previously stored plane-wave hologram such that a first, un-diffracted portion thereof is reflected by the second beam splitter 134 of the dual beam splitter assembly 132 downward onto the beam block 138 and is terminated thereby. A second portion of the comparatively strong object beam 105 is diffracted such that it is reflected by the first beam splitter 136 of the dual beam splitter assembly 132 upward. The FLC polarization rotator 140 is oriented such that substantially 100% of the diffracted object beam is transmitted through beam splitter 142 and focused by double convex lens 148 through FLC polarization rotator 150. Polarization rotator 150 is configured such that substantially 100% of the diffracted object beam is reflected by beam splitter 152 onto one-dimensional CCD array 156.

Simultaneously, the substantially weaker reference beam 103 is transmitted through the spinning disk 10 and reflected upwardly by the first beam splitter 136 of the dual beam splitter assembly 132 and through FLC polarization rotator 140, beam splitter 142, double convex lens 148, FLC polarization rotator 150, and is reflected by beam splitter 152, onto one-dimensional CCD array 156 whereon the diffracted object beam and the reference beam interfere with one another so as to form a fringe pattern representative of the space relationship of the object and reference beams, which is representative of the relative path lengths thereof.

Preferably, the intensity of the object beam 105 and the intensity of the reference-beam 103 are determined by the Pockels cell 100 such that the diffracted portion of the object beam 105 and the reference beam 103 have approximately equal intensities at the one-dimensional CCD array 156 so as to facilitate the formation of a fringe pattern thereon.

The translation stage may be utilized, as desired, to adjust the path length of the object beam 105 so as to obtain substantially equal path lengths in an effort to maintain desired phase relationship between the object and reference beams during the write and erase processes.

Galvanometer Mirror Calibration

Figure 7:
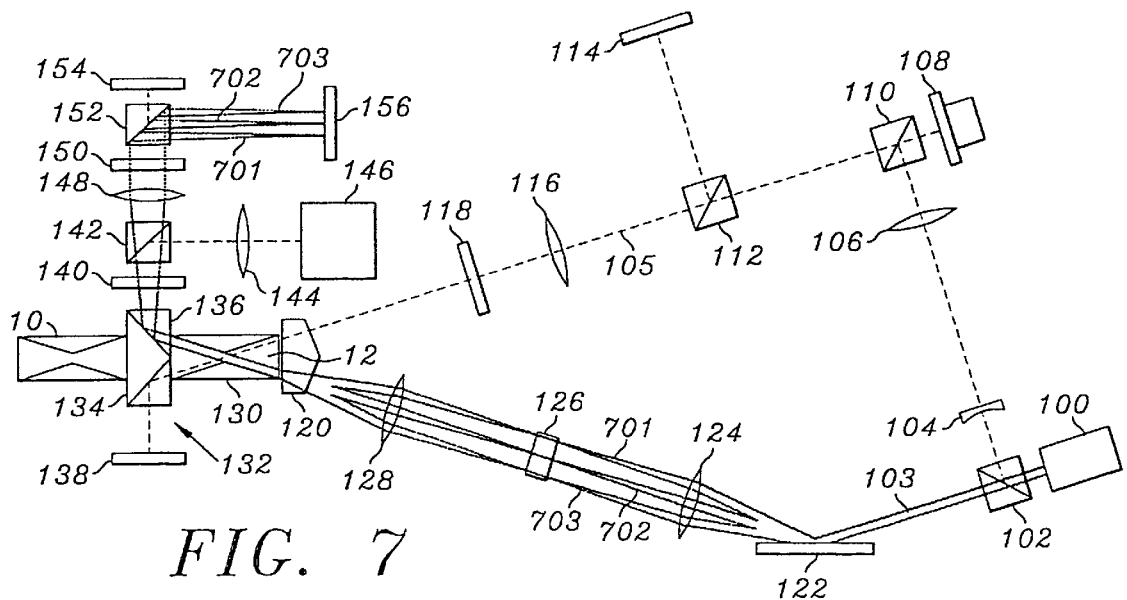
FIG. 7 is the schematic representation of the spinning disk volume holographic memory of FIG. 2 showing galvanometer calibration.

Referring now to FIG. 7, the process of calibrating the galvanometer mirror 122 is discussed. The galvanometer mirror 122 must be calibrated such that the angular orientations thereof which are necessary to form the desired angle multiplexed holograms upon a spinning disk can quickly and reliably be reproduced. This is accomplished by sensing the position of the galvanometer mirror 122 via sensing of the position of the reference beam 103 reflected thereby onto the one-dimensional CCD array 156.

More particularly, during the galvanometer mirror 122 calibration, the Pockels cell polarization rotator 100 rotates the polarization of the laser beam such that substantially 1000 thereof is transmitted through beam splitter 102 and thus is subsequently reflected by galvanometer mirror 122, focused with double convex lenses 124 and 128, and transmitted through coupling prism 120 into spinning disk 10. The laser beam exits the spinning disk 10 through the central opening 14 thereof and is reflected upwardly via the first beam splitter 136 of the dual beam splitter assembly 132. FLC polarization rotator 140 is configured such that it orients the polarization of the laser beam such that substantially 100% thereof is transmitted through beam splitter 142 to double convex lens 148. Double convex lens 148 focuses the laser beam through FLC polarization rotator 150 which is configured such that it orients the polarization of the laser beam such that substantially 100% thereof is reflected by beam splitter 152 onto the one-dimensional CCD array 156.

As such, each orientation of the galvanometer mirror 122 provides a focused laser beam at a different position of the one-dimensional CCD array 156. For example, each of three different orientations of the galvanometer mirror 122 produce each of three different laser beams 701, 702, and 703, each of which is focused upon the one-dimensional CCD array 156 at a different position. Thus, the angular orientation of the galvanometer mirror 122 can easily be determined and measured so as to assure accurate and reliable control thereof during reading, writing, and erasure operations.

It is understood that the exemplary spinning disk volume holographic memory described herein and shown in the drawings represents only the presently preferred embodiment of the invention. Indeed, various modifications and additions may be made to such embodiment without departing from the spirit and scope of the invention. For example, those skilled in the art will appreciate the various different means for polarizing, reflecting, focusing, and otherwise manipulating the object beam, reference beam, and other beams are likewise suitable for use in the present invention. Also, although a methanol phase conjugator is utilized in the preferred embodiment of the present invention, various other materials may also be utilized, depending upon the frequency and intensity of the laser beam being utilized. Thus, these and other modifications and additions should be obvious to those skilled in the art and may be implemented to the present invention for use in a variety of different applications.

What is claimed is:

1. A volume holographic memory comprising:
   a) a disk comprised of photorefractive medium, said disk having an outer edge, a central opening, an upper surface having a first groove formed therein, and a lower surface having a second groove formed therein, said first and second grooves defining a generally hourglass-like cross-section of said disk;
   b) object beam optics configured to direct an object beam trough the outer edge of said disk; and
   c) reference beam optics configured to direct a reference beam through the outer edge of said disk;
   d) wherein said object beam and said reference beam cooperate within said photorefractive medium to sequentially form a plurality of volume holograms therein, said disk spinning as the holograms are formed.

2. The volume holographic memory as recited in claim 1 wherein said disk comprises iron-doped $LiNbO_3$.

3. The volume holographic memory as recited in claim 1 wherein said disk is approximately 6 centimeters in diameter and approximately 1.2 centimeters thick.

4. The volume holographic memory as recited in claim 1 wherein said disk is configured such that the object and reference beams contact a substantial portion of upper and lower surfaces thereof during write operations, so as to facilitate dissipation of photovoltaic charges generated within said disk.

5. The volume holographic memory as recited in claim 1 wherein said disk further comprises a conductive layer formed upon the upper and lower surfaces thereof to facilitate dissipation of photovoltaic charges within said disk.

6. The volume holographic memory as recited in claim 1 wherein said disk further comprises fillets formed within said first and second grooves to inhibit stress crack formation within said disk.

7. A holographic storage medium comprising:
   a) photorefractive material configured as a disk having an upper surface, a lower surface, and an outer edge;
   b) said upper surface having a first groove formed therein; and
   c) said lower surface having a second groove formed therein;
   d) wherein said first and second grooves define a generally hourglass-like cross section of said disk.

8. The holographic storage medium as recited in claim 7 wherein said photorefractive material comprises iron-doped $LiNbO_3$.

9. The holographic storage medium as recited in claim 7 wherein said disk is configured such that object and reference beams contact a substantial portion of said upper and lower surfaces thereof during write operations, so as to facilitate dissipation of photovoltaic charges within said disk.

10. The holographic system memory as recited in claim 7 further comprising a conductive layer formed upon said upper and lower surfaces of said disk to facilitate dissipation of photovoltaic charges within said disk.

11. The holographic system memory as recited in claim 7 further comprising fillets formed within said first and second grooves to inhibit stress crack formation within said disk.

12. A method for erasing a stored volume hologram, the method comprising the steps of:
    a) spinning a disk comprised of photo-refractive medium about an axis thereof, said disk having an outer edge;
    b) directing an object beam through the outer edge of the disk;
    c) simultaneously directing a reference beam through the outer edge of said disk;
    d) wherein the path length of either the object beam or the reference beam is approximately one-half wavelength different from the corresponding path length utilized to write the stored volume hologram, such that an "inverse" volume hologram is defined by interference of the object beam and reference, the inverse volume hologram substantially canceling the stored volume hologram.

* * * * *

UNITED STATES PATENT AND TRADEMARK OFFICE
CERTIFICATE OF CORRECTION

PATENT NO. : 5,966,361
DATED : October 12, 1999
INVENTOR(S) : Harold M. Stoll and James John Reis It is certified that error appears in the above-identified patent and that said Letters Patent is hereby corrected as shown below:

On the title page item,

[75] Harold M. Stoll, Rancho Palos Verdes, Calif.
James John Reis, Fresno, Calif.

Signed and Sealed this

Eighteenth Day of July, 2000

Attest:

Q. TODD DICKINSON

Attesting Officer

Director of Patents and Trademarks